Patented Dec. 24, 1946

2,413,170

UNITED STATES PATENT OFFICE 2,413,170

LIQUID STABLE AT LOW TEMPERATURES

Frank M. Clark, Pittsfield, Mass., assignor to General Electric Company, a corporation of New York No Drawing. Application April 1, 1943,
Serial No. 481,462

4 Claims. (Cl. 252—65)

The present invention comprises liquid compositions which are suitable for uses in fields in which extraordinarily low temperatures are encountered, as, for example, in hydraulic and electric apparatus which is exposed to temperatures as low as —40° C., or even lower during use or shipment.

It is required that liquids in such apparatus must not only have congealing temperatures so low that there is no likelihood of solidification, but such liquids usually should have low viscosity which is retained at low temperatures. It is also highly desirable that such low congealing liquids should not form crystalline components which would clog hydraulic apparatus and would cause breakdown of electrical apparatus.

In many respects liquid compositions made up of a mixture of unlike chlorinated components are well suited to withstand excessively low temperatures without congelation. If the chlorine content of such compositions is sufficiently high they are non-inflammable. It is found, however, that upon prolonged exposure to low temperatures solid crystalline components form in otherwise liquid compositions.

I have discovered that the formation of crystals at excessively low temperatures in such compositions is inhibited or wholly prevented by the presence of a minor content of unhalogenated carbo-hydrogen compounds, that is less than ten percent by weight. Although larger additions of such crystal inhibitors are not precluded substantially larger additions will impart inflammability to a composition. Preferably the amount of carbo-hydrogen compound should be within a range of one to seven percent, and usually approximately one percent.

My invention will be illustrated by the following examples of compositions containing alkylated benzene compounds which have been halogenated.

A composition comprising the following components has a congelation temperature of about —56° C., when tested in a normal manner. When exposed to —40° C. for a protracted period, varying from a day to a week, crystals are slowly formed. The behavior of such compositions resembles that of supercooled liquids.

| Ingredients | Parts by weight |
|---|---|
| Trichlorbenzene | 35 |
| Tetrachlor ethyl benzene | 34.2 |
| Pentachlor ethyl benzene | 22.8 |
| Pentachlor diphenyl | 8.0 |

When about one to seven parts by weight of a crystal inhibitor, such, for example, as mineral oil is added then slow crystallization no longer occurs even though the compositions are exposed for an indefinite period to such extreme cold as —40° C. or even lower.

The mineral oil addition may be chosen in a wide range of viscosities say from 50 to 2000 seconds Saybolt at 100° F. However, even solid materials as hereinafter shown may be added to prevent crystal formation with time.

In place of mineral oil any one or a mixture of the following crystallization-inhibiting materials may be substituted, including not only hydrocarbons, but also other organic or carbo-hydrogen compounds. The following materials, which are used in a non-halogenated state, are illustrative: diphenyl, diphenyl oxide, pinene, benzene, toluene, isopropyl benzene, wood rosin, hexane, cyclohexane, dimethyl naphthalene, N-butyl alcohol, isoamyl alcohol.

A second composition adapted to remain liquid at excessively low temperatures is the following, in which chlorinated diphenyl is not present:

| Ingredients | Parts by weight |
|---|---|
| Pentachlor ethyl benzene | 24.8 |
| Tetrachlor ethyl benzene | 37.2 |
| Trichlor benzene | 38.0 |
| Crystal inhibitor | 1–7 |

Although both the above examples illustrative of my invention comprise ethyl benzene compounds, it should be understood that the advantages accruing from the present invention are not limited to such compounds. Retention of liquidity at extremely low temperatures also is obtained in compositions comprising other chlorinated compounds, such as chlorinated toluene and chlorinated isopropyl benzene. While my invention is not restricted to halogenated alkylated aromatic compounds its advantages in this class of compositions is most marked. Fluorine and other halogens may be used in place of chlorine.

In the dielectric field, as in electric capacitors, compositions embodying my invention have been found to be particularly advantageous in high frequency circuits. For example, a dielectric composition, such as above described containing trichlor benzene, tetra and pentachlor ethyl benzene, and pentachlor diphenyl, the amount of mineral oil being about one percent, has the following dielectric constant and power factor in a range of operating temperatures at 1000 kilocycles.

| Temp., °C. | Diel. const. | Power factor |
|---|---|---|
| 25 | 4.05 | 0.058 |
| 50 | 3.93 | .040 |
| 75 | 3.75 | .025 |
| 100 | 3.65 | .021 |

It is noteworthy that the power factor falls with a rise of temperature of the composition. The dielectric constant falls only to an insignificant extent. This characteristic of the described compositions is not peculiar to the particular frequency here given. It is obtained at frequencies higher than about ten kilocycles. At low commercial frequencies (e. g. 60 cycles) the power factor normally rises as the temperature rises.

The power factor is low over a wide range of frequency as indicated by the following table, the power factor being indicated in percent.

| Temp., °C. | Frequency in kilocycles | | | | | |
|---|---|---|---|---|---|---|
| | 140 | 400 | 550 | 650 | 800 | 1000 |
| 25 | 0.020 | 0.026 | 0.033 | 0.037 | 0.044 | 0.058 |
| 100 | .075 | .033 | .031 | .035 | .035 | .021 |

The characteristics at 1000 kilocycles of the second illustrative composition (in which chlorinated diphenyl is absent) are indicated by the following table. The amount of mineral oil in this instance was one percent.

| Temp., °C. | Diel. const. | Power factor |
|---|---|---|
| 25 | 4.14 | 0.040 |
| 50 | 3.98 | .022 |
| 75 | 3.83 | .020 |
| 100 | 3.71 | .019 |

It should be noted that the power factor decreases and at 100° C., is slightly less than one half its value at 25° C.

Power capacitors constructed to be operable at high efficiency and with a low power factor and containing halogenated compounds of low viscosity will be described in another patent application Serial No. 486,047, filed May 7, 1943.

What I claim as new and desire to secure by Letters Patent of the United States is:

1. A low viscosity liquid composition of matter which is capable of remaining liquid at about −40° C. for protracted periods without the formation therein of crystals, which composition consists principally of (1) a mixture of chlorinated ethyl benzenes and (2) mineral oil constituting from about one to seven percent by weight of said composition.

2. A low viscosity liquid composition of matter which is capable of remaining liquid at about −40° C. for periods at least as long as one week without the formation therein of crystals, said composition consisting principally of (1) tetrachlor ethyl benzene, pentachlor ethyl benzene and trichlorbenzene and (2) mineral oil constituting from about one to seven percent by weight of said composition.

3. A low viscosity liquid composition of matter which is capable of remaining liquid at about −40° C. for a time as long as one week without the formation therein of crystals, said composition consisting of (1) tetrachlor ethyl benzene, pentachlor ethyl benzene and trichlorbenzene and (2) about 1% of mineral oil by weight.

4. A low viscosity liquid composition of matter which is capable of remaining liquid at about −40° C. for as long as one week without the formation therein of crystals, said composition consisting of the following ingredients in substantially the proportions indicated by weight

| | Parts |
|---|---|
| Trichlorbenzene | 35 |
| Tetrachlor ethyl benzene | 34 |
| Pentachlor ethyl benzene | 22 |
| Pentachlor diphenyl | 8 |
| Mineral oil | 1 |

FRANK M. CLARK.